C. WIDEMANN.

VENETIAN SHADE.

No. 6,941. Reissued Feb. 22, 1876.

Attest
Courtney A. Cooper.
O. Jordan Jones

C. Widemann Inventor
By
Charles E. Foster
Atty

UNITED STATES PATENT OFFICE.

CHARLES WIDEMANN, OF NEW YORK, N. Y., ASSIGNOR TO MARCUS HEIM.

IMPROVEMENT IN VENETIAN SHADES.

Specification forming part of Letters Patent No. 169,502, dated November 2, 1875; reissue No. 6,941, dated February 22, 1876; application filed January 29, 1876.

*To all whom it may concern:*

Figure 1:
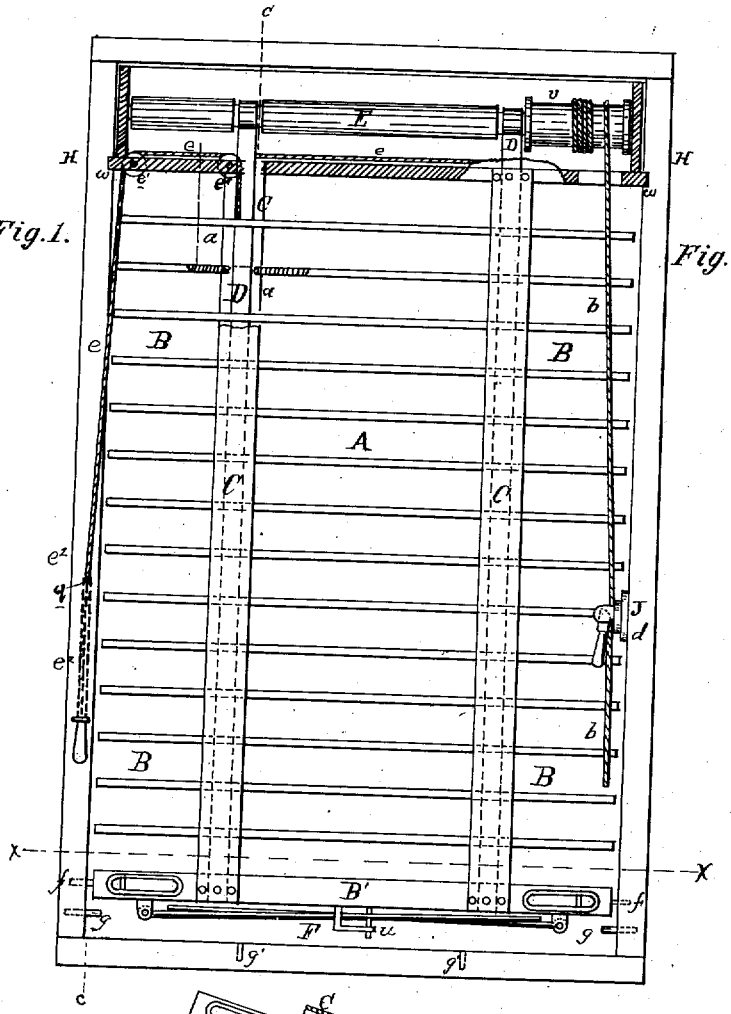
Figure 2:
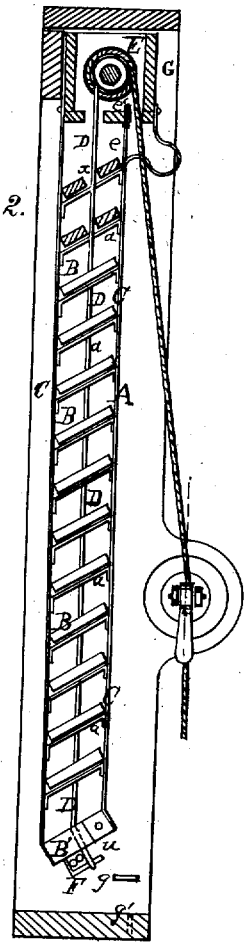
Figure 3:
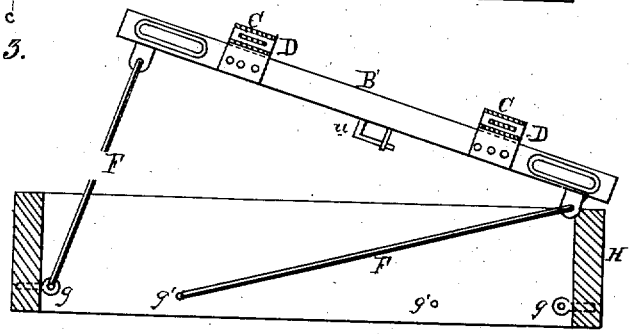

Be it known that I, CHARLES WIDEMANN, of the city, county, and State of New York, have invented certain Improvements in Venetian Shades, of which the following is a specification:

In the accompanying drawing, Figure 1 represents a sectional front elevation of the improved Venetian shade; Fig. 2, an end view of the same, partly in vertical transverse section on the line *c c*, Fig. 1; Fig. 3, a horizontal section of parts shown on the line *x x* of Fig. 1, but in a different position.

H H represent the side pieces of a window-frame, having near the top grooves or shoulders *w* for the support of an oblong box, G, within which turns a longitudinal roller, E, having at one end a drum, *v*. The roller E is reduced in diameter at two points to receive tapes D, which extend through the slats B of a Venetian shade or blind, A, of which C C are the usual flexible "ladders," the blind being hung nearest the outer edge of the frame. The openings *x* in the slats are made oblong, and the bottom slat B′ is of increased thickness, and is furnished with a bolt or retainer, *f*, at each end. To the under side of the lower slat B′ are jointed two rods, F F, the ends of which are adapted to eyes or recesses *g g′* in the sill or sides of the window-frame, suitable catches *u* being arranged upon the slat B′, so as to retain the rods in the position shown in Fig. 1 when not in use. Cords *e* pass over rollers $e^1$, turning in openings in the bottom of the box G, and are connected to the inside bands of the ladders C, the cords being united and forming a single cord, $e^2$, which may be secured at the side of the window-frame by a suitable retainer, a straight pin, *q*, adapted to links of a chain, $e^3$, being shown. The cord *b* from the drum *v* passes to a retainer, J, arranged at the side of the frame. The blind is so suspended within the window-frame that it may be thrown outward beyond the side of the house to the inclined position occupied by an ordinary awning, in which position it is secured by disconnecting the rods F F from the catch *u* and inserting their inner ends in the eyes *g g′*. When in this position the slats may be turned to any suitable angle by means of the cords *e*, to freely admit the air while excluding the direct rays of light; or the slats may be folded upon each other to exclude both light and air.

The blind may also be adjusted to any angle, as shown in Fig. 3, by simply altering the positions of the rods F.

When the blind is not in use as an awning the rods F are folded and secured to the lower slat B′, the cord *b* serving to adjust the blind to any height desired. As the rods F are thus secured to the lower slat, they are out of the way, leaving the window-frame entirely unobstructed when the article is used solely as a blind.

As the roller E and pulleys are arranged within the box G, all the parts are maintained in their position without danger of displacement when the blind is removed from the window.

I claim—

1. A Venetian blind, consisting of the flexible ladders C C, slotted slats, and elevating-tapes, detachably suspended in the window-frame, combined with appliances whereby it may be projected outwardly at the bottom and retained in that position to form a temporary awning, as set forth.

2. The combination, with a Venetian blind, of rods F, hung to the lower slat of the blind, and retainers *u*, whereby said rods may be retained in contact with the slat, substantially as set forth.

3. The combination of the ladders C C, slats B, and a detachable box, G, to which the ladders are hung and within which the roller E and adjusting appliances are arranged, substantially as specified.

In testimony whereof I have signed my name to this specification in the presence of two subscribing witnesses.

CHARLES WIDEMANN.

Witnesses:

A. ASCHER,

MORRIS J. HIRSCH.